United States Patent Office 3,845,194
Patented Oct. 29, 1974

3,845,194
PROCESS FOR THE REGENERATION OF PHOSPHORUS OXYCHLORIDE OR OXYBROMIDE FROM REACTION MIXTURES
Tibor Somlo and Alain Claude Rochat, Birsfelden, and James Murphy, Riehen, Switzerland, assignors to Ciba-Geigy AG, Basel, Switzerland
No Drawing. Filed Sept. 27, 1972, Ser. No. 292,562
Claims priority, application Switzerland, Oct. 8, 1971, 14,714/71
Int. Cl. C01b 25/10
U.S. Cl. 423—300                   12 Claims

ABSTRACT OF THE DISCLOSURE

Process for the regeneration of phosphorus oxyhalides from reaction mixtures which contain polymeric phosphorus compounds as by-products produced in the reaction of phosphorus oxyhalides with compounds which can be halogenated, dehydrated or condensed, characterised in that phosphorus pentahalides or phosphorus trihalides and halogen are added to these reaction mixtures and the resulting phosphorus oxyhalide is separated from the mixture, halogen being intended to be understood as bromine or especially chlorine.

---

The phosphorus oxyhalides, especially phosphorus oxychloride, are known as very versatile reagents. Phosphorus oxychloride is above all employed advantageously as a chlorinating agent and dehydrating agent. For example, it replaces enolic hydroxyl groups by chlorine atoms or dehydrates amides to nitriles. It is also used as a condensation agent for cyclisation reaction. Chlorides of carboxylic acids and sulphonic acids are also obtainable by means of phosphorus oxychloride. It is frequently the only reagent which can be used for carrying out the reactions mentioned. Phosphorus oxybromide is above all used for replacing hydroxyl groups, preferably hydroxyl groups on heterocyclic structures, by bromine. These diverse possible uses have hitherto been limited by difficulties in working up the reaction mixtures. In order to be able to isolate the products, the reaction mixtures were in most cases poured into water so that the polymeric transformation products of the phosphorus oxyhalide as well as any excess of oxyhalide were destroyed hydrolytically and the products could be separated from the aqueous phosphoric acid produced. This method of working up suffers from certain difficulties:

The high exothermicity, which frequently is difficult to control, results in some serious hazards.

The destruction of large amounts of the phosphorus oxyhalide is involved and expensive.

Large amounts of harmful effluents are produced.

Products which are sensitive to hydrolysis cannot be manufactured at all by this method.

In the reactions with phosphorus oxychloride or phosphorus oxybromide which have been mentioned, one or more halogen atoms of the phosphorus oxyhalide are always replaced by hydroxyl groups and the phosphorus compounds containing hydroxyl groups condense to give the polymers mentioned, say according to the following equation, wherein X denotes chlorine or bromine and $n$ denotes an integer.

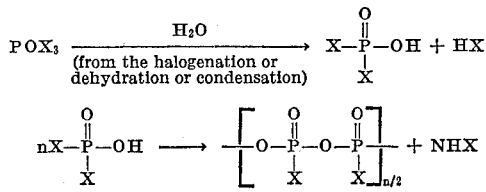

It has now been found, surprisingly, that the phosphorus oxyhalide employed can be regenerated quantitatively with phosphorus pentahalide or preferably phosphorus trihalide and halogen from the polymeric transformation products which are present in the reaction mixture. In this reaction, phosphorus oxyhalide is also produced from the added phosphorus pentahalide or phosphorus trihalide and halogen. Thus the entire amount of the phosphorus compounds employed for the previous reaction and for the subsequent regeneration is recovered as phosphorus oxyhalide. The regeneration takes place according to the following equation, wherein X and $n$ have the indicated meaning.

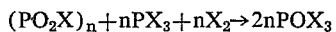

The present invention thus relates to a process for the regeneration of phosphorus oxyhalides from reaction mixtures which contain polymeric phosphorus compounds produced as by-products in the reaction of phosphorus oxyhalides with compounds which can be halogenated, dehydrated or condensed, characterised in that phosphorus pentahalides or halogen and phosphorus trihalides are added to these reaction mixtures and the resulting phosphorus oxyhalide is separated from the mixture, halogen being intended to be understood as bromine or especially chlorine.

The use of phosphorus trihalide and halogen for practical purposes corresponds to the production of the phosphorus pentahalide in situ and is preferred since the pentahalides frequently contain decomposition products and impurities, which worsens the purity of the reaction products.

These reagents required for the regeneration are preferably used in an amount equivalent to the phosphorus oxyhalide consumed in the preceding reaction, so that after the regeneration the reaction mixture only contains the reaction product, phosphorus oxyhalide and, where relevant, the catalyst used and the solvent.

The phosphorus oxyhalide can conveniently be separated by distillation from the remaining mixture after the regeneration. This separation takes place most simply if excess phosphorus oxychloride was used as the solvent in the preceding reaction so that no further solvent is present in the reaction mixture which might distil off together with the phosphorus oxyhalide. The residue after the distillation is then anhydrous reaction product, possibly as the hydrochloride or hydrobromide if basic groups are contained in the product, together with the catalyst employed, where applicable. Instead of excess phosphorus oxyhalide it is also possible to use other aprotic solvents, preferably those of boiling point above 100° C., for example chlorobenzene, o-dichlorobenzene or petroleum fractions, in which case it may be possible to dispense with an excess of phosphorus oxyhalide. Aprotic solvents are those of which the molecules cannot release any H+-ions (protons).

The regeneration is preferably carried out under the influence of heat. Temperatures of 30 to 150° C. are favourable.

The process according to the invention is above all suitable for the regeneration of phosphorus oxychloride from the reaction mixtures produced when carrying out a chlorination reaction. In these reactions, a hydroxy group or especially an enolisable keto group is replaced by a chlorine atom. For example, the products indicated in Column II of the table below are obtained by reaction of the compounds indicated in Column I with phosphorus oxychloride, followed by regeneration of the phosphorus oxychloride in accordance with the process of the invention. Column III indicates the yield of end product relative to the starting products (Column I) employed and Column IV indicates the yield of regenerated phosphorus oxychloride relative to the total amount of phosphorus compounds employed (see, in this context, the comments in columns 1 and 2.
| I | II | Percent III | IV |
|---|---|---|---|
| 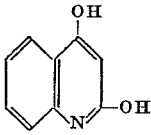 | 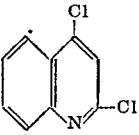 | 98 | 95 |
| 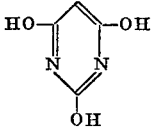 | 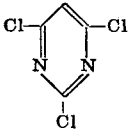 | ----- | ----- |
| 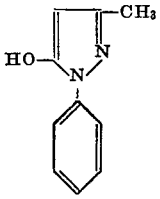 | 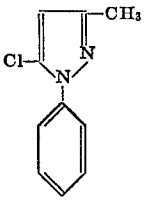 | 87 | 89 |
| 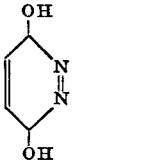 | 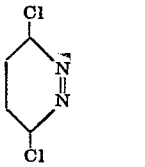 | 83 | 96 |
| 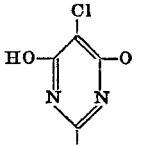 | 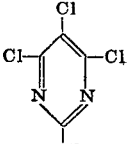 | 93 | 97 |
| 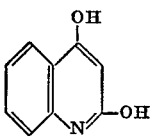 | 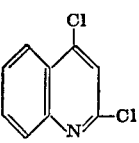 | 98 | 95 |
| 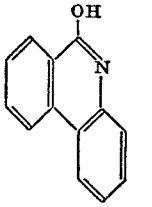 | 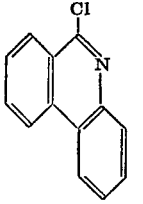 | 80 | 98 |
| 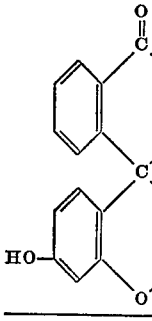 | 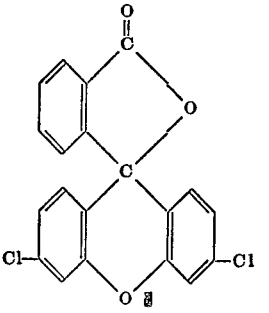 | 80 | 98 |

The corresponding brominations with phosphorus oxybromide take place analogously to the reactions with phosphorus oxychloride though frequently with worse yield. At times, higher temperatures are required. However, because of the great technical importance of the chlorine compounds and because of their better accessibility, the reactions with phosphorus oxychloride are much more important.

Dehydrations, for example the dehydration of amides to nitriles, and cyclisation reactions, can also be carried out in accordance with the process of the invention. In these, a hydroxyl group present can simultaneously be replaced by a chlorine atom. Since phosphorus oxychloride reacts more selectively than, say, phosphorus pentachloride, acids containing hydroxyl groups can thereby be converted into the corresponding chlorine-containing acids without forming the acid chloride at the same time. If it is desired to replace the hydroxyl group by chlorine *and* to form the acid chloride from the acid, it is appropriate first to manufacture the chlorine-containing acid with the requisite amount of phosphorus oxychloride and then to add 2 equivalents of phosphorus pentachloride, which results firstly in the regeneration of the phosphorus oxychloride and secondly in the formation of the acid chloride. The following reactions were carried out, for example, with regeneration of the phosphorus oxychloride, the yields indicated being relative to the starting product employed or relative to the total amount of phosphorus compounds employed, respectively.

Cyclisation of N-phenylanthranilic acid

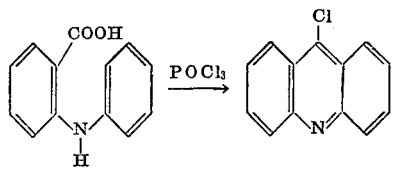

Yield of 9-chloroacridine—91%
Yield of regenerated $POCl_3$—94.5%

Transformation of amide to nitrile

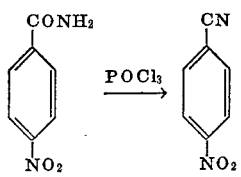

Yield of p-nitrobenzonitrile—96%
Yield of regenerated $POCl_3$—99%

Chlorination of benzilic acid

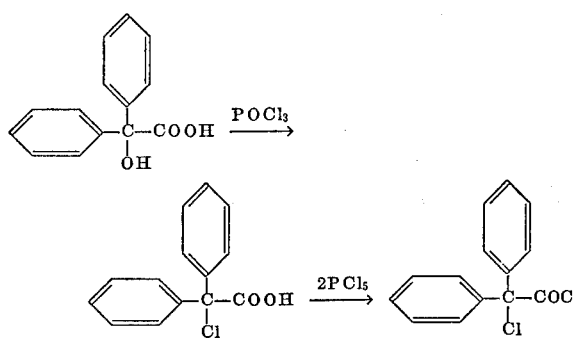

Yield of diphenylchloroacetyl chloride—87%
Yield of regenerated $POCl_3$—91%

The process according to the invention has the advantage that no phosphorus oxychloride is consumed but that phosphorus oxychloride is formed from chlorine and phosphorus trichloride (or phosphorus pentachloride). The total amount of phosphorus compounds employed is, in this process, recovered as phosphorus oxychloride. This fact is to be regarded as a great advance above all in the field of protection of the environment, since hitherto, in such reactions, the transformation products as well as any excess of the phosphorus oxychloride were simply destroyed with water. In this way, large amounts of phosphoric acid passed into the effluent. In reactions which require, for example, tertiary amines as catalysts, it was also not possible to recover these compounds, which are frequently very poisonous, and this resulted in further contamination of effluent.

Using the process according to the invention, contaminated effluent can be avoided and this thus denotes a great ecological advance. The working-up of the reaction mixture is simple and neither phosphorus oxychloride nor the catalyst which may be employed are lost. Finally, it is also possible to manufacture substances which are sensitive to hydrolysis, which was not possible in accordance with the process hitherto customary. With the gentle working-up according to the invention, the yields are in most cases excellent.

The products obtained according to the invention can be used as intermediate products in diverse ways, for example for the manufacture of reactive dyestuffs.

In the examples which follow the parts, unless otherwise stated, denote parts by weight and the percentages denote percentages by weight. The reactions should of course all be carried out with exclusion of moisture.

EXAMPLE 1

A suspension of 174 parts of 1-phenyl-3-methylpyrazolone in 460.5 parts of phosphorus oxychloride is warmed. At 40° C., a clear solution is produced from which, on further heating, a precipitate separates out which, however, redissolves at 100° C. The temperature rises from 100° C. to 120° C. over the course of 3½ hours. After this time the mixture is cooled to 70° C., 137 parts of phosphorus trichloride are added and 71 parts of chlorine gas are passed in. Thereafter the mixture is briefly warmed to 110° C. The phosphorus oxychloride is then distilled off through a high performance packed column, whereby 547 parts of phosphorus oxychloride are obtained. The residue is then distilled, yielding 167 parts (87% of theory) of 5-chloro-3-methyl-1-phenylpyrazole (boiling point 92° C. at 0.6 mm. Hg).

EXAMPLE 2

112 parts of 3,6-pyridazinediol and 614 parts of phosphorus oxychloride are stirred for 20 minutes at 70–90° C. The reaction mixture is then cooled to 40° C., 274 parts of phosphorus trichloride are added and 142 parts of chlorine gas are passed in over the course of one hour, whilst keeping the temperature at 50° C. and 80° C. The phosphorus oxychloride is distilled off through a high performance packed column. 880 parts of phosphorus oxychloride are recovered (95.5% regeneration).

Water is added to the residue and the resulting solution is neutralised with ammonia, whereupon the 3,6-dichloropyridazine in part separates out as a precipitate. The product is filtered off and the filtrate is repeatedly extracted with ether. The ether extracts are evaporated and the residue is combined with the precipitate which has been filtered off. The product is dried and 123 g. (83% of theory) of almost pure 3,6-dichloropyridazine are obtained. The product can be purified further by high vacuum distillation (melting point 68.5° C.).

EXAMPLE 3

324.3 parts of 4-hydroxycoumarine are suspended in 1170.5 parts of phosphorus oxychloride. The suspension is added dropwise over the course of 2 hours, at 80° C., to 83.5 parts of phosphorus oxychloride and the apparatus for the dropwise addition is rinsed with 83.5 parts of phosphorus oxychloride. The reaction mixture is kept for 6 hours at 80° C. to 90° C., in the course of which it gradually turns a dark colour. It is cooled to 40° C., 275 parts of phosphorus trichloride are added and 142 parts of chlorine gas are passed in. The mixture is warmed to 100° C. Thereafter the phosphorus oxychloride is distilled off by means of a packed column, yielding 1589 parts (96.5% regeneration). The residue is then distilled. 217 g. (60.5% of theory) of 4-chlorocoumarine (melting point 92° C.) are obtained at 110° C. and 1 mm. Hg.

EXAMPLE 4

A mixture of 80.5 parts of 2,4-dihydroxyquinoline and 307 parts of phosphorus oxychloride is stirred for 20 minutes at 110° C. to 115° C. Thereafter the mixture is cooled to 40° C., 137 parts of phosphorus trichloride are added, 71 parts of chlorine gas are passed in and the whole is briefly warmed to 100° C.

The phosphorus oxychloride is separated off by means of a packed column under a low vacuum (approx. 100 mm. Hg) and 436 parts (95% regeneration) of this compound are recovered.

The residue is stirred with approx. 100 parts of water. The mixture is neutralized with sodium hydroxide solution and thereafter repeatedly extracted with ether. The ether extracts are evaporated and the residue, which consists of 96.8 parts (98% of theory) of almost pure 2,4-dichloroquinoline, is dried.

Thereafter the product can be purified by distillation. 92 parts of 2,4-dichloroquinoline (melting point 65° C.), representing a yield of 93% of theory, are obtained at 95° C. and 0.3 mm. Hg.

EXAMPLE 5

83 parts of fluorescein are suspended in 390 parts of o-dichlorobenzene and the suspension is added dropwise over the course of 105 minutes, at 90° C., to a mixture of 77 parts of phosphorus oxychloride and 260 parts of o-dichlorobenzene. An orange suspension is produced, which is slowly warmed to 135° C.–140° C. After 5 hours the mixture is cooled to 110° C.–115° C., 69 parts of phosphorus trichloride are added, 35.5 parts of chlorine gas are passed in over the course of 1½ hours and thereafter the whole is heated to 135–140° C. After the mixture has been kept at this temperature for 45 minutes, it is concentrated to half its volume by distillation under a low vacuum. The distillate contains 150 parts of phosphorus oxychloride (98% regeneration) and o-dichlorobenzene.

The residue is poured into water and the o-dichlorobenzene is removed therefrom by steam distillation. The solution which remains is adjusted to pH 7.0–7.5 with sodium bicarbonate. A brown suspension is produced, which is filtered. The residue which has been filtered off is washed with water and dried. It consists of 79.9 g. of dichlorofluorane (79.3% of theory).

EXAMPLE 6

55.1 parts of N,N-diethylaniline are run into 440.5 parts of phosphorus oxychloride, with good stirring. 162.5 parts of 5-chlorobarbituric acid are introduced into this mixture, whereupon the temperature rises to about 55° C. The mixture is heated to about 100° C. over the course of 90 minutes, during which hydrochloric acid begins to split off. The reaction temperature is raised to 140° C. over the course of 6 to 7 hours and this temperature is maintained for 3 hours. The mixture is then allowed to cool to 80° C. A part of the polymer formed separates out as an oil and makes stirring difficult. At 80° C., 413 parts of phosphorus trichloride are added dropwise to the mixture and chlorine is passed in at the same time. After completion of the addition of phosphorus trichloride, chlorine is further passed in at 60° C. until it is no longer absorbed. In total, approx. 213 parts of chlorine gas are consumed.

The resulting solution is heated for 30 minutes under reflux at approx. 105° C. and is then cooled to 30–40° C. The phosphorus oxychloride is distilled off under a vacuum of about 150 mm. Hg, without allowing the internal temperature to rise above 83° C. Approx. 840 parts of regenerated phosphorus oxychloride (97% of theory) are obtained. The hot residue is poured, with vigorous stirring, into a separating beaker into which 178 parts of acid and 150 parts of water were first introduced. The temperature of the mixture rises to 60–80° C. of its own accord, so that tetrachloropyrimidine melts and separates out as a lower layer. The tetrachloropyrimidine phase is poured into 500 parts of water whilst stirring vigorously. The product immediately precipitates as crystals. After stirring for 30 minutes, the precipitate is filtered off and the filter residue is washed with water. After drying at 30 to 40° C. in vacuo, 207 parts of tetrachloropyrimidine (93% of theory) are obtained.

After separating off the tetrachloropyrimidine, a hydrochloric acid solution of the diethylaniline hydrochloride is left in the separating beaker. This is adjusted to pH 10 with sodium hydroxide solution and the diethylaniline liberated is extracted with 173.4 parts of toluene. A fractional distillation of the toluene extracts yields approx. 147 to 156 parts of toluene (86% of the amount employed) and approx. 50 parts of diethylaniline of 70–80% purity (determined by gas chromatography), corresponding to about 68% of the amount employed.

If instead of 5-chlorobarbituric acid the unsubstituted barbituric acid is used and in other respects the same procedure as indicated above is followed, 2,4,6-trichloropyrimidine is obtained.

EXAMPLE 7

153 parts of phosphorus oxychloride are warmed to 40° C. and 53 parts of N-phenylanthranilic acid are added in 4 portions. After addition of each portion, the mixture is allowed to react until the exothermic effect has subsided and the evolution of hydrogen chloride gas had ceased. Thereafter the suspension is warmed to 110° C., stirred for 15 minutes at this temperature and then cooled to 40° C. At this temperature, 68.8 parts of phosphorus trichloride are added and 35.5 parts of chlorine gas are passed in. Thereafter the mixture is warmed to 110° C. for 15 minutes, cooled to 25° C. and mixed with 98 parts of petroleum ether. The suspension is filtered off and the filter residue is washed with a little petroleum ether and dried. 48 parts (91% of theory) of analytically pure 9-chloroacridine are thus obtained (melting point 117° C.).

The mother liquor is distilled. In addition to the petroleum ether recovered, this yields 217 parts of pure phosphorus oxychloride (95% of theory).

EXAMPLE 8

83 parts of 4-nitrobenzamide are suspended in 140 parts of ligroin and 77 parts of phosphorus oxychloride are added dropwise to the suspension at 110° C. After stirring for a further hour at 110° C. the mixture is cooled to 50° C., 69 parts of phosphorus trichloride are added and 35.5 parts of chlorine gas are then passed in. The mixture is briefly warmed to 110° C. to complete the reaction and is then cooled and mixed with a further 150 parts of ligroin. The crystalline product is separated off by filtration and dried. 71.1 parts (96% of theory) of analytically pure p-nitrobenzonitrile are obtained.

The filtrate contains 152 parts of phosphorus oxychloride (99% of theory), which is separated from the ligroin by distillation.

EXAMPLE 9

45.6 parts of benzillic acid and 154 parts of phosphorus oxychloride are stirred for 4 hours at 55° C. 54.8 parts of phosphorus trichloride are then added to the colourless solution and 28.4 parts of chlorine gas are thereafter passed in. The mixture is subsequently stirred for 15 minutes at 100–110° C. and the phosphorus oxychloride is then distilled off through a column, 193 parts of phosphorus oxychloride being recovered (90.5% of theory). The residue is distilled in vacuo and yields 46 parts (87% of theory) of diphenylchoroacetyl chloride (melting point 49–50° C.).

What we claim is:

1. A process for the dehydration or the halogen-replacement of a hydroxyl group in an organic compound with a phosphorus oxyhalide, selected from the group consisting of phosphorus oxychloride and phosphorus oxybromide, without substantial consumption of the phosphorus oxyhalide, comprising the steps of treating the organic compound with a phosphorus oxyhalide to produce a dehydrated or halogenated organic reaction product and a polymeric phosphorus compound having $PO_2Cl$, $PO_2Br$ or $PO_2OH$ as the repeating unit, subsequently treating the reaction mixture with a phosphorus pentahalide selected from the group consisting of phosphorus pentachloride and phosphorus pentabromide or with phosphorus trichloride and chlorine or phosphorus tribromide and bromine to regenerate the phosphorus oxyhalide from the polymeric phosphorus compound, and finally separating the resulting phosphorus oxyhalide from the reaction mixture.

2. The process of claim 1 wherein there is used an amount of phosphorus pentahalide or phosphorus trihalide and halogen which is approximately a molar equivalent of the phosphorus oxyhalide consumed in the first step of the process.

3. The process of claim 2 wherein phosphorus oxychloride and phosphorus pentachloride are used.

4. The process of claim 1 wherein, in the last step, the phosphorus oxyhalide is separated from the reaction mixture by distillation.

5. The process of claim 1 wherein the phosphorus oxyhalide is regenerated in an aprotic solvent.

6. The process of claim 5 wherein the aprotic solvent is excess phosphorus oxyhalide.

7. The process of claim 1 wherein the regeneration is carried out at a temperature of 30 to 150° C.

8. The process of claim 1 wherein the phosphorus oxyhalide is phosphorus oxychloride and the organic compound, treated in the first step, is a hydroxy compound or an enolisable keto compound.

9. The process of claim 8 wherein the hydroxy compound or enolisable keto compound is a nitrogen heterocycle.

10. The process of claim 9 wherein the nitrogen heterocycle is 2,4,6-trihydroxypyrimidine.

11. The process of claim 1 wherein the organic reaction in the first step is a dehydrative cyclization.

12. The process of claim 1 wherein the organic reaction in the first step is the conversion of a carboxylic acid or a sulfonic acid to an acid chloride with phosphorus oxychloride.

References Cited
UNITED STATES PATENTS

| | | | |
|---|---|---|---|
| 1,921,370 | 8/1933 | North | 432—300 |
| 3,388,969 | 6/1968 | Nametz et al. | 423—300 |
| 3,406,013 | 10/1968 | Müller-Schiedmayer et al. | 423—300 |

WILBERT J. BRIGGS, Sr., Primary Examiner

U.S. Cl. X.R.

260—251 R, 543 R, 544 Y